(12) United States Patent
Tonelli et al.

(10) Patent No.: US 8,522,670 B2
(45) Date of Patent: Sep. 3, 2013

(54) HYDRAULIC CIRCUIT FOR INSTANT BEVERAGE MACHINES, RELIEF AND SAFETY VALVE FOR SAID CIRCUIT AND METHOD FOR THE PREPARATION OF INSTANT BEVERAGES

(75) Inventors: Stefano Tonelli, Gaggio Montano (IT); Massimo Lelli, Gaggio Montano (IT)

(73) Assignee: Koninklijke Philips N.V., Eindhoven (NL)

( * ) Notice: Subject to any disclaimer, the term of this patent is extended or adjusted under 35 U.S.C. 154(b) by 1063 days.

(21) Appl. No.: 11/989,325

(22) PCT Filed: Jul. 26, 2006

(86) PCT No.: PCT/EP2006/064678
§ 371 (c)(1),
(2), (4) Date: Apr. 10, 2008

(87) PCT Pub. No.: WO2007/014891
PCT Pub. Date: Feb. 8, 2007

(65) Prior Publication Data
US 2009/0151573 A1 Jun. 18, 2009

(30) Foreign Application Priority Data
Jul. 27, 2005 (IT) .................. FI2005A0169

(51) Int. Cl.
*A47J 31/057* (2006.01)
(52) U.S. Cl.
USPC .................. 99/300; 99/275; 99/279; 99/293; 99/299; 99/290; 222/52; 222/146.2; 137/883; 137/878; 251/129.15

(58) Field of Classification Search
USPC .................. 99/280, 290, 300, 275, 279, 293, 99/299; 137/883; 222/52, 54, 57, 146.2
See application file for complete search history.

(56) References Cited

U.S. PATENT DOCUMENTS

| | | | | |
|---|---|---|---|---|
| 3,147,767 | A * | 9/1964 | Goss ............................. | 137/879 |
| 3,421,546 | A * | 1/1969 | Jennings et al. .............. | 137/523 |
| 5,299,592 | A * | 4/1994 | Swanson ........................ | 137/59 |
| 5,778,765 | A | 7/1998 | Klawuhn et al. | |
| 6,019,028 | A * | 2/2000 | Schmed ......................... | 99/293 |
| 6,161,469 | A * | 12/2000 | Rolla ............................. | 99/293 |
| 7,089,849 | B2 * | 8/2006 | Chen et al. .................... | 99/290 |
| 7,219,597 | B2 * | 5/2007 | Eicher ............................ | 99/293 |
| 7,223,427 | B2 * | 5/2007 | Knepler ........................ | 426/231 |

(Continued)

FOREIGN PATENT DOCUMENTS

| | | |
|---|---|---|
| CN | 85201815 U | 3/1986 |
| CN | 86210041 U | 12/1987 |

(Continued)

OTHER PUBLICATIONS

Zhaoyun, CN 86210041 machine translation, Dec. 1986, 4 pages.*

(Continued)

*Primary Examiner* — Gene Kim
*Assistant Examiner* — Matthew B Stanczak (57) ABSTRACT

A hydraulic circuit for instant beverage machines includes a tank, a water extraction pipe contained in the tank, a flowmeter connected to the extraction pipe, a pump, a first vibration-damping valve, a boiler, a second relief and safety valve, a water/steam faucet, a third beverage flow valve, and a recovery tank.

11 Claims, 6 Drawing Sheets

(56) References Cited

U.S. PATENT DOCUMENTS

| | | | |
|---|---|---|---|
| 7,284,680 B2 * | 10/2007 | Farano et al. | 222/52 |
| 7,640,845 B2 * | 1/2010 | Woodnorth et al. | 99/300 |
| 7,673,557 B2 * | 3/2010 | Bienvenu et al. | 99/291 |
| 7,946,219 B2 * | 5/2011 | Marconi | 99/323.1 |
| 2003/0066430 A1 * | 4/2003 | Bitar et al. | 99/275 |
| 2004/0079237 A1 | 4/2004 | Denisart | |
| 2005/0279216 A1 * | 12/2005 | Miller | 99/279 |
| 2006/0249030 A1 * | 11/2006 | Bienvenu et al. | 99/291 |
| 2008/0168905 A1 * | 7/2008 | Hart | 99/280 |
| 2008/0245238 A1 * | 10/2008 | Huiberts | 99/300 |

FOREIGN PATENT DOCUMENTS

| | | |
|---|---|---|
| EP | 0 465 877 | 1/1992 |
| EP | 0 676 163 | 10/1995 |
| EP | 1 415 580 | 5/2004 |
| IT | 930 236 | 6/1995 |
| WO | 2006122916 A1 | 11/2006 |

OTHER PUBLICATIONS

Wen, CN 85201815 machine translation, Apr. 1985, 3 pages.*
International Search Report dated Oct. 24, 2006.
International Preliminary Report on Patentability dated Dec. 27, 2007.

* cited by examiner

HYDRAULIC CIRCUIT FOR INSTANT BEVERAGE MACHINES, RELIEF AND SAFETY VALVE FOR SAID CIRCUIT AND METHOD FOR THE PREPARATION OF INSTANT BEVERAGES

This application is the U.S. national phase of International Application No. PCT/EP2006/064678 filed 26 Jul. 2006 which designated the U.S. and claims priority to IT FI2005A000169 filed 27 Jul. 2005, the entire contents of each of which are hereby incorporated by reference.

FIELD OF THE INVENTION

The present invention relates to machines used for the preparation of instant beverages such as coffee and the like

STATE OF THE ART

Different types of instant beverage machines are known in the art, for example machines for making instant coffee.

They are provided with a hydraulic circuit which generally comprises a water tank, an infusion chamber for preparing the beverage, devices for feeding the powder of said beverage to said infusion chamber, devices for pumping water from the tank through the hydraulic circuit and toward the infusion chamber and an outlet spout for the instant beverage.

Typical hydraulic circuits used for the above purpose have a valve called electromagnet with a one-way (or multi-way) solenoid valve, used for performing many adjustment functions.

The water coming from the boiler enters said valve and controls the excess water discharge, the water delivery at high temperature or steam from special external spouts that can be used by the user, and the inlet of water at high temperature into the infusion chamber where the instant beverage is prepared, which is then delivered via the external spout.

The valves used are typically provided with an electromagnet and are known as Electromagnets with stem (or needle) valve. These valves have numerous drawbacks:

they can be affected by scale;
they are noisy;
they can only control the discharge phase, hence they do not have multiple uses unless they are connected in series or in parallel with each other and equipped with additional boilers or heat exchangers to control the steam phase and maximum-pressure valves to control the safety of the circuit;
recharge or drainage (when necessary) is not guaranteed when the circuit is unused for long periods of time
they cannot control the passage from the vapor state to the liquid state because in certain applications it is necessary to use special self-priming valves—expensive and not reliable—which may be used with the pumps. In other cases, complex and ineffective manual operations may have to be carried out by the user.

The hydraulic circuit, according to the present invention, is capable of overcoming the aforesaid drawbacks by introducing a topology based on one electromagnet and one boiler.

SUMMARY OF THE INVENTION

The present invention relates to a hydraulic circuit for instant beverage machines, a relief and a safety valve for said circuit and method for the preparation of instant beverages, as described in the claims which are an integral part of this description.

DETAILED DESCRIPTION OF THE INVENTION

Figure 1:
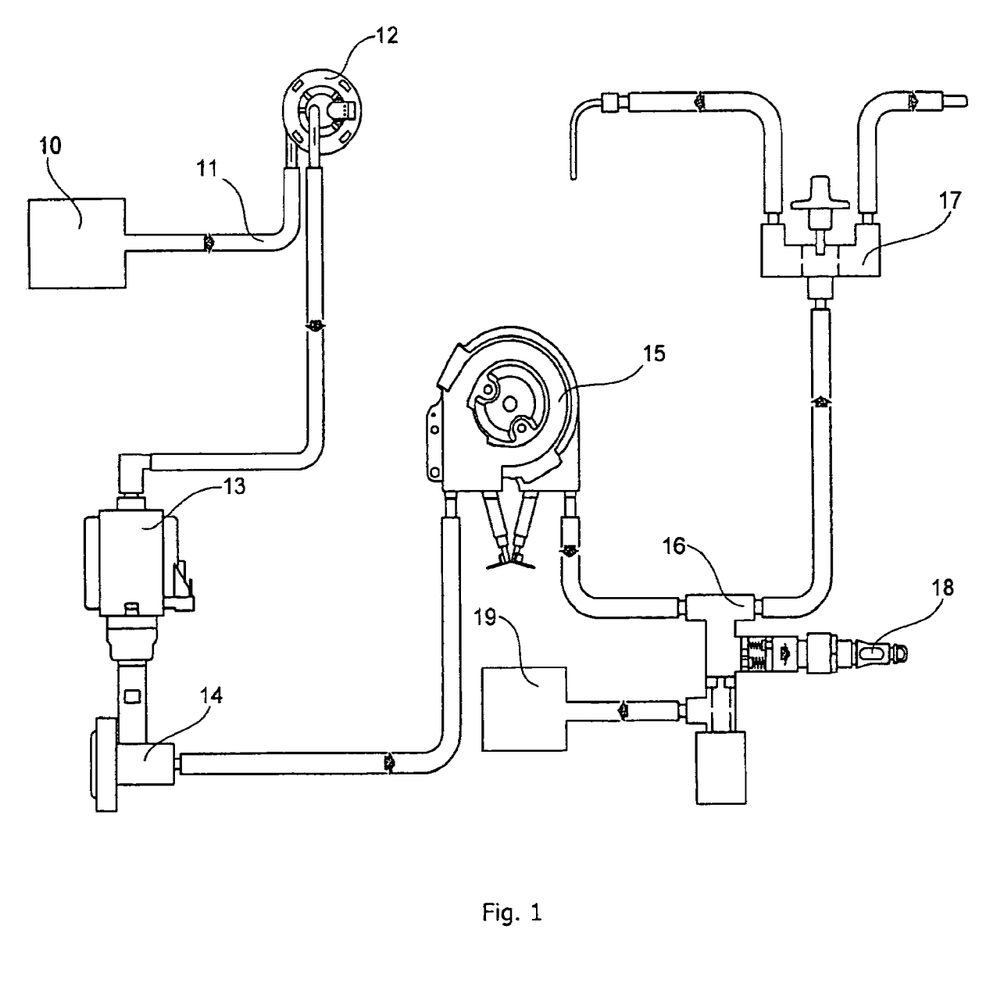
FIG. 1 shows a diagram of a hydraulic circuit for machines used for the preparation of instant beverages according to the present invention.

With reference to FIG. 1, we can see a diagram of a hydraulic circuit for machines used for the preparation of instant beverages according to the present invention. There is a tank 10 which is connected to an extraction pipe 11 for the water contained in it. Said extraction pipe 11 leads the water into a pump 13 through a flow-meter 12. Said pump 13 is connected to the boiler 15 through a first vibration-damping valve 14 which releases the water into said tank if the pressure exceeds a specific threshold value. Downstream of said boiler is the relief and safety valve 16 provided with one inlet and three outlets. Downstream of said relief and safety valve 16 is a beverage flow valve 18 and a water/steam faucet 17 used for adjusting the delivery of steam or water/steam mixture towards the outside of the instant beverage machine, so that it can be used, for instance, to prepare other types of beverages.

When the user selects the beverage, the following operations take place:

1. the pump 13, pressurizes the water contained in the hydraulic circuit.
2. When the pressure of the hydraulic circuit exceeds a predetermined threshold, for example, set at about three bars, the water is discharged in a recovery tank 19 through the relief valve 16
3. after a set time interval, the pump 13 stops and thus the hydraulic circuit is closed.
4. By using the control circuit and at least one temperature sensor, the boiler 15 can heat up the water to a preset temperature value.
5. At this stage, the beverage delivery unit moves to the operating position by engaging the delivery connector—pin, terminal connecting part of the hydraulic circuit.
6. When the pressure reaches about 3 bars, said relief valve 16 makes the water flow inside said delivery unit.
7. The beverage is delivered through the beverage flow valve 18.
8. After releasing the beverage, a special command from the control circuit energises the control coil 31 of the relief valve 16 which opens up, thus reducing the pressure of the hydraulic circuit when the delivery unit is still engaged in the delivery connector—pin.
9. Likewise, the liquid pressurised in the delivery unit flows out through a hole with a spring calibrated at 0.2 bars and flows out of the drain towards said recovery tank 19.
10. The delivery unit returns to its initial position.
11. The operation is repeated up to step 2. in order to empty possible beverage residues from the circuit.

According to the present invention, the hydraulic circuit, by following the aforesaid sequence of steps, is able to overcome numerous drawbacks associated with the instant beverage machines included in the state of the art.

As a result, steps 1 to 3 will help remove the water with inadequate temperature from the hydraulic circuit and preheat all conduits, thereby achieving a beverage at an ideal temperature.

If the pump is unable to operate due to irregular functioning or overpressure, through said flow-meter 12 placed along the hydraulic circuit, the electronic control unit will warn you that there is no passage of liquid. Thus, the circuit will be discharged and self-recharging attempts will be performed. Without the aid of this system, everything would have to be carried out manually, thus making things difficult for the user.

Step 6 limits the pressure in the circuit to a typical value of about three bars. This will improve the safety and the reliability of the instant beverage machine, thereby also eliminating puffs in the infusion chamber, hence maintaining a constant temperature at higher values and achieving an optimum beverage.

Step 9, related to the post-infusion pressure release, allows better cleaning because the tablet for the preparation of the beverage is drier and the temperature remains constant.

Step 11 eliminates the reflux of any small particles coming from the infusion chamber toward the hydraulic circuit. Said particles can be harmful because they can damage the seals or contaminate the water or the steam coming out of the steam pipe, hence causing negative organoleptic consequences on the beverage to be prepared. This result is achieved, in the hydraulic circuits included in the state of the art, by introducing special one-way and/or two-way valve systems. Placing said relief and safety valve 16 inside the hydraulic circuit, according to the present invention, will reduce the pressure inside the circuit and eliminate the safety valve normally used in machines for the preparation of instant beverages included in the state of the art. Furthermore, since said relief and safety valve 16 is of the "slide" type, it is able to achieve an active-type seal, thus allowing less noise—because the coil requires less pilot power considering that it is aided by the pressure of the circuit—and avoiding scale problems, such as sticking parts, and thus allowing its positioning in the warm and/or calcareous zone of the hydraulic circuit, which is perfect for its operation.

Figure 2:
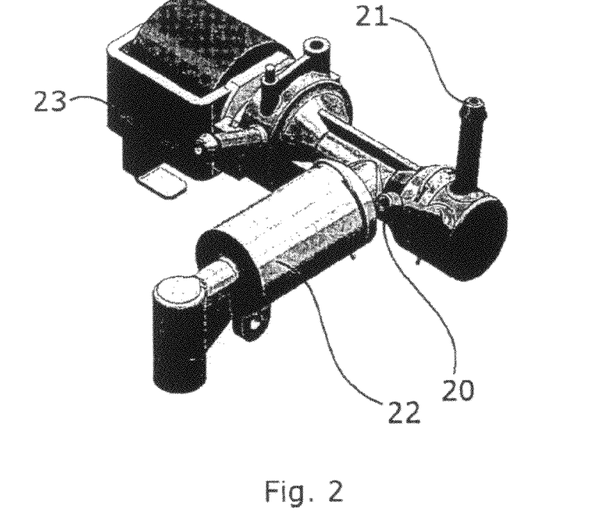
FIG. 2 shows a structure of the relief and safety valve.

With reference to FIG. 2, we can see the detailed structure of said relief and safety valve 16. We can see, in the order given, the water and steam inlet 20 from the boiler 15, a first water and steam outlet 21 directed towards the faucet 17, a second outlet 22 of the pressurised water directed towards the beverage delivery valve 18 and a third outlet 23 for discharging water into the recovery tank 19, which is operated by a solenoid valve equipped with a maximum pressure limiting device—e.g. a pre-calibrated spring—which remains closed during normal operation and opens up if the pressure exceeds a specific threshold, usually around $16/20$ bars, or if a specific command is sent to the control coil of the solenoid valve.

Figure 3:
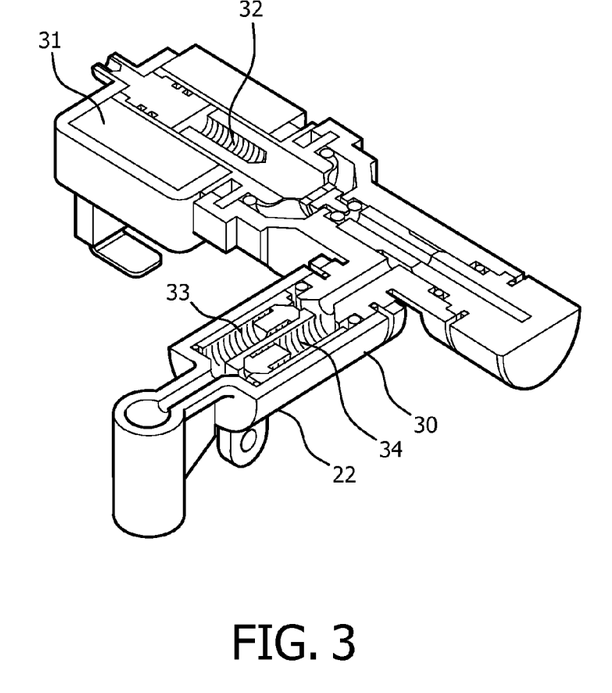
FIG. 3 shows a structure of an embodiment of the relief and safety valve.

With reference to FIG. 3, we can see the detailed structure of an embodiment of said relief and safety valve 16. Said outlet 22, which is connected to the beverage delivery unit, has a valve provided with a spring 33 usually calibrated at about 3 bars. In addition, it is provided with an inlet 30 with a spring 34 calibrated at 0.2 bars, which allows the passage of liquid in order to release the beverage delivery unit from the pressure. Said outlet 23, used for discharging water into the tank, is provided with a control coil 31 which is energised with an appropriate command and with a spring 32 calibrated at about $16/20$ bars. As previously described, said relief and safety valve 16 is, for example, the "slide" type. This makes it possible to combine the safety valve and a double-exchange valve, placed between the electropilot and the beverage delivery unit, in one body.

Figure 4A:
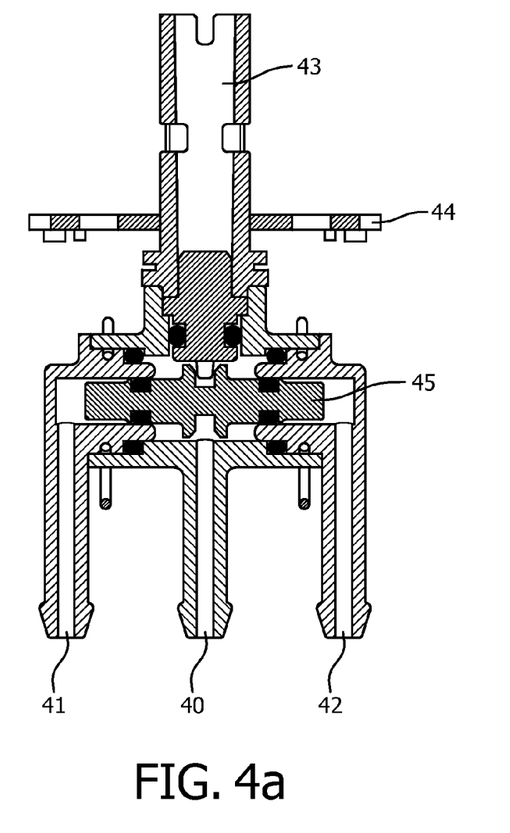
FIGS. 4a, 4b, 4c show structures of an embodiment of the water/steam faucet.

With reference to FIG. 4, we can see the detailed structure of an embodiment of said water/steam faucet 17. In FIG. 4a, we can see said faucet in the first, out of three, possible positions. There is an inlet 40 and two outlets 41, 42, one of which 41 is directed to the outlet nozzle of the machine used for delivering water or steam, whereas the other 42 is directed, for instance, toward possible devices connected to the instant beverage machine, such as the cappuccino device, in accordance with the published Italian Patent application No. MI2005A000880. Additionally, there is a faucet lever 43, a support 44 provided with sensors for detecting the position of said lever 43 and a slider 45 which opens and closes the passages of said faucet 17.

Figure 4B:
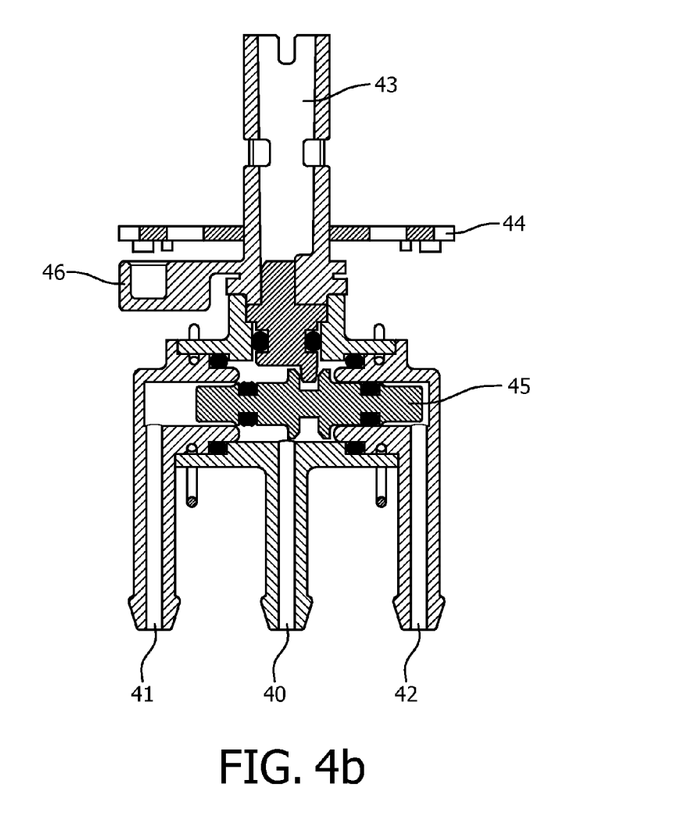
Figure 4C:
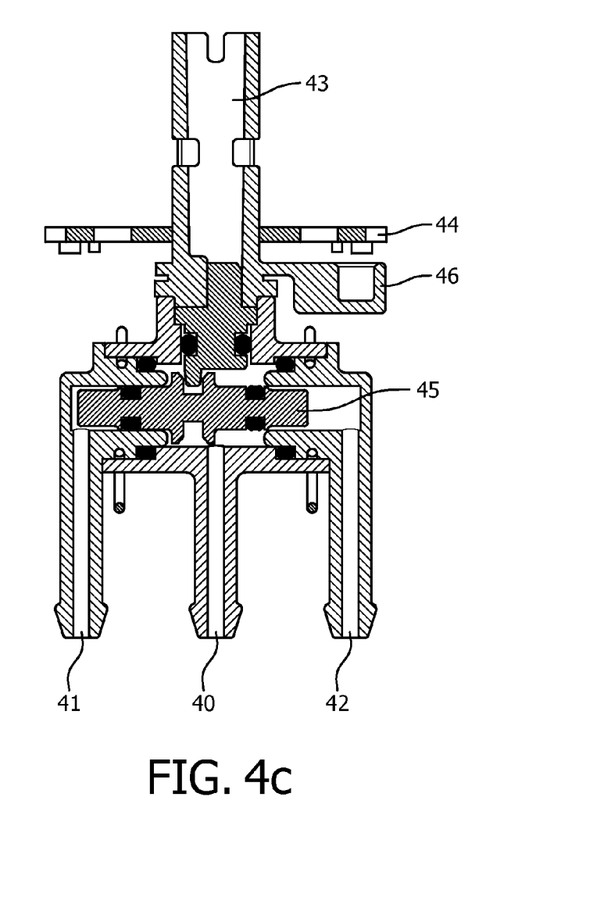

FIGS. 4b and 4c show other two positions that can be reached by said faucet 17. The selection of the outlets is carried out by turning the faucet lever 43. Said lever 43 is connected to said slider 45 which opens or closes the outlets, according to the position, by selecting the outlet required. The position of said lever 43 is detected by sensors, e.g. REED sensors, placed on the support of the faucet, and by a magnet 46 placed on said lever 43. Each position of the lever 43 corresponds to a specific function—for instance, position 1 delivers water and steam to the faucet, the boiler heats the water to proper temperature and the pump delivers the water/steam mixture.

The invention claimed is:

1. A hydraulic circuit for beverage machines, the hydraulic circuit comprising a tank, a water extraction pipe contained in said tank, a flow-meter connected to said extraction pipe, a pump, a vibration-damping valve, a boiler, a relief and safety valve, a water/steam faucet, a beverage flow valve for delivering a beverage outside a beverage machine, a recovery tank, said relief and safety valve comprising a water/steam inlet, a first water/steam outlet directed to said faucet, a second outlet for directing pressurized water to said beverage flow valve and a third outlet for discharging water into the recovery tank, said third outlet being controlled by a solenoid valve equipped with a control coil, wherein said solenoid valve is equipped with a first maximum pressure limiting device, wherein said second outlet is provided with a second maximum pressure limiting device for directing the pressurized water to the beverage flow valve, and wherein said second outlet has an inlet which is provided with a valve equipped with a third maximum pressure limiting device which enables passage of liquid in order to release pressure from the beverage flow valve.

2. The hydraulic circuit of claim 1, wherein said first maximum pressure limiting device comprises a first pre-calibrated spring.

3. The hydraulic circuit of claim 1, wherein said second maximum pressure limiting device comprises a second pre-calibrated spring.

4. The hydraulic circuit of claim 1, wherein said third maximum pressure limiting device comprises a third pre-calibrated spring.

5. The hydraulic circuit of claim 1, wherein said relief and safety valve is of the "slide" type.

6. The hydraulic circuit of claim 1, wherein said faucet comprises an inlet, a first outlet, a second outlet, a faucet lever for selecting one of the first outlet and the second outlet, a support provided with sensors for detecting the position of said faucet lever, and a slider capable of opening and closing passages of said faucet.

7. The hydraulic circuit of claim 6, wherein said faucet is provided with a device for determining the position of said slider.

8. The hydraulic circuit of claim 7, wherein said device for determining the position of said slider comprises at least one REED sensor and at least one magnet.

9. The hydraulic circuit of claim 1, wherein the first maximum pressure limiting device remains closed during normal operation and opens up if pressure exceeds a specific threshold, or if a specific command is sent to the control coil of said solenoid valve.

10. The hydraulic circuit of claim 1, wherein the first maximum pressure limiting device comprises a first pre-calibrated spring calibrated at about $16/20$ bars, wherein the second maximum pressure limiting device comprises a second pre-calibrated spring calibrated at about 3 bars, wherein the third maximum pressure limiting device comprises a third pre-calibrated spring calibrated at about 0.2 bars.

11. The hydraulic circuit of claim 1, wherein the control coil of the third outlet is configured to be energized with a command and with a spring calibrated at about $16/20$ bars.

* * * * *